United States Patent
Ehnert (10) Patent No.: US 7,175,796 B2
(45) Date of Patent: Feb. 13, 2007

(54) METHOD FOR PRODUCING CERAMIC BRAKE DISKS FROM BMC

(75) Inventor: Gerd Ehnert, Vic Fezensac (FR)

(73) Assignee: Menzolit-Fibron GmbH, Bretten (DE)

( * ) Notice: Subject to any disclaimer, the term of this patent is extended or adjusted under 35 U.S.C. 154(b) by 541 days.

(21) Appl. No.: 10/381,518

(22) PCT Filed: Sep. 19, 2001

(86) PCT No.: PCT/EP01/10800

§ 371 (c)(1),
(2), (4) Date: Aug. 13, 2003

(87) PCT Pub. No.: WO02/27208

PCT Pub. Date: Apr. 4, 2002

(65) Prior Publication Data

US 2004/0035657 A1     Feb. 26, 2004

(30) Foreign Application Priority Data

Sep. 29, 2000  (DE) ............................... 100 49 748
Aug. 9, 2001   (DE) ............................... 101 39 288

(51) Int. Cl.
  *B29C 45/14*   (2006.01)
  *F16D 69/00*   (2006.01)

(52) U.S. Cl. ............................. 264/257; 264/325
(58) Field of Classification Search ............... 264/29.2, 264/122, 125, 257, 325, 328.6
See application file for complete search history.

(56) References Cited

U.S. PATENT DOCUMENTS 4,810,444 A *  3/1989  Alberino et al. ............ 264/102
6,261,981 B1 * 7/2001  Dietrich et al. ............. 501/95.2
6,517,756 B1 * 2/2003  Rebstock .................... 264/108

\* cited by examiner

*Primary Examiner*—Steven P. Griffin
*Assistant Examiner*—Carlos Lopez
(74) *Attorney, Agent, or Firm*—Antonelli, Terry, Stout and Kraus, LLP.

(57) ABSTRACT

The invention relates to a method for producing ceramic brake discs, comprising the following steps: a) producing a BMC compound (2) with a matrix consisting of phenol resin and with carbon reinforcement fibres, the length of the carbon fibres being between 6 mm and 50 mm; b) poducing a green compact of the ceramic brake discs from the BMC compound (2) in a transfer moulding or injection compression moulding process, c) pyrolysing the green compact in order to produce a porous moulded body; and d) melt-infiltrating the porous moulded body with a melt, preferably a silicon melt, in order to produce a moulded body with reaction-bonded fibers.

10 Claims, 8 Drawing Sheets

METHOD FOR PRODUCING CERAMIC BRAKE DISKS FROM BMC

The invention relates to a process for producing ceramic brake disks.

The use of carbon-fibre-reinforced carbon (CFC materials) in brake disks is limited to about 500° C. on account of the oxidation sensitivity of the carbon fibres. One application is, for example, in Formula One vehicles. An exact matching of the CFC disk quality is necessary, corresponding to the prevailing weather conditions. The service life only extends over one race. The material is not suitable for use in production vehicles. Disadvantages are the high cost, the high degree of wear, and the weather-dependent and temperature-dependent coefficient of friction.

With short-carbon-fibre-reinforced ceramic bodies (ceramic matrix composites (CMC)) it is possible for higher strength to be obtained at high temperatures. Frequently, however, no adequate damage tolerance for high-performance applications is obtained such as is demanded for brake disks, for example. The production of such a material with short-fibre reinforcement is undertaken by the so-called structural-granulation method, as described in DE 197 11 829 C1.

With a view to enhancing the damage tolerance, it is state of the art to introduce a long-fibre reinforcement with carbon-fibre fabric. This process is very elaborate and cost-intensive with regard to the preparation of blanks, the amount of blanking waste and the cost of the carbon-fibre semifinished product.

The production of brake disks from ceramic advanced SMC (sheet moulding compound) with short-fibre and long-fibre reinforcement according to PCT/EP00/00253 and DE 199 01 215 A1 is a more economical alternative, with higher damage tolerance than the reinforcement with carbon-fibre fabric. However, the preparation of blanks for the pressing of the brake disks is still too cost-intensive, on account of the effort involved.

For the large-scale production of brake disks, a modern and rational process technology is required that is directed towards the future.

Therefore a process is proposed for the production of ceramic brake disks from BMC (bulk moulding compound), comprising the following process steps:

a) production of a BMC compound (2) with a matrix consisting of phenolic resin and with reinforcing fibres consisting of carbon, the length of the carbon fibres being between 6 mm and 50 mm, b) production of a green compact of the ceramic brake disks from the BMC compound (2) using the transfer-moulding process or injection/compression process, c) pyrolysing the green compact for the purpose of producing a porous moulded article and d) melt infiltration of the porous moulded article with a melt, preferably with a silicon melt, for the purpose of producing a moulded article with reaction-bonded fibres.

BMC moulding compounds and their composition are described, for example, in *Kunststoff-Handbuch,* Wilbrand Woebcken, Edition 10, *Duroplaste,* Hanser Verlag, 1988, pp 312–323.

Features of the present invention:

Production of a BMC with ceramic matrix and carbon-fibre reinforcement.

Trouble-free manufacture of relatively large batch quantities. In comparison with the SMC production process, BMC can be manufactured rationally using CMC (continuous-moulding-compound) process technology in the semifinished-product form that is suitable for the injection-moulding process or transfer-moulding process. These process technologies are more rational, less cost-intensive and less manpower-intensive than the processing of SMC in the pressing process. Larger batch, quantities can be manufactured without difficulty.

Generation of the requisite fibrous structure for the brake disk in the course of processing of the compound to form brake disks.

According to the invention, BMC with a matrix consisting of phenolic resin and a carbon-fibre reinforcement is used as compound. The length of the reinforcing fibres may be between 6 mm and 50 mm. With a view to optimising the ceramic properties, working may take place with several different lengths of fibre in one compound Production of the BMC is undertaken in a facility operating continuously (continuous impregnated compound). The compound that is produced using this process technology has only a slight deterioration of the carbon fibre and is therefore preferred. However, manufacture of the ceramic BMC is also possible in the kneaders that are conventional for BMC production.

Processing of the ceramic advanced BMC according to the invention is undertaken using the transfer-moulding process or injection/compression process. The advantages of this process technology consist in the more rational processing with less manual effort than in the pressing process with SMC, with the elaborate creation of blanks. With a view to adapting the properties of the material to the application for brake disks, the fibrous structure can be generated when the compound is introduced into the moulding tool. By virtue of the use of multi-component injection-moulding technology, several compounds with different lengths of fibre can be introduced into the tool simultaneously, and corresponding fibrous structures can be generated.

The transfer-moulding process may preferably be employed. The transfer-moulding process is the combination of the pressing technique with an injection cylinder in the middle of the tool. Via a central cylinder and piston, in which the requisite quantity of compound has been introduced, the moulding compound is injected into the closed or slightly open tool. The cylinder may also be filled with the aid of an injection-moulding machine or an extruder.

The injection/compression process is a further possibility for producing the brake disks according to the invention, or, to be more exact, the green compact for them. The ceramic advanced BMC is injected into the closed or slightly open tool using an injection-moulding machine that has been adapted to the ceramic matrix in its pressure and temperature settings. After the quantity of compound has been introduced into the heated tool, the tool is closed and the compound is distributed in the mould.

In an advantageous refinement of the invention, the moulded articles produced by the process according to the invention, or, to be more exact, the brake disks, exhibit ventilation fins on the inside diameter on both sides of the ceramic brake disk. The cooling by ambient air is improved by this means.

In addition, on both sides of the ceramic brake disk, on the surface thereof, uninterrupted ventilation ducts are disposed in advantageous manner in straight, circular or involute arrangement for the purpose of dissipating heat.

The cross-section of the ventilation ducts expediently has an angular or round form, with widths amounting to between 1 mm and 10 mm.

The present invention describes, in detail:

BMC with ceramic matrix and carbon-fibre reinforcement for ceramic brake disks.

Reinforcing-fibre lengths from 6 mm to 50 mm.

One or more lengths of fibre in one compound.

Fibre proportions from 10 vol. % to 60 vol. %.

Extrusion of the BMC into cylindrically shaped portions or extrusion into plastic bags with a view to simple charging into injection-moulding machines.

Processing of the ceramic BMC in injection-moulding machines using the injection/compression process or in suitable presses using the transfer-moulding process.

Generation of the fibre arrangement by source flow of the ceramic BMC when the moulding compound is introduced into the brake-disk tool or into the press.

Generation of fibre orientations in the peripheral direction of the ceramic brake disk.

By varying the tool opening when the ceramic BMC is introduced, an influence can be exerted on the fibre orientation in the peripheral direction. Interlocking and alignment in the second and third dimensions take place when the tool is closed.

Disk design with ventilation fins on the inside diameter on both sides of the ceramic brake disk.

Uninterrupted ventilation ducts in straight, circular or involute arrangement on both sides of the ceramic brake disk for the purpose of dissipating heat on the surface of the brake disk.

Cross-section of the ventilation ducts in angular or round form, and widths from 1 mm to 10 mm.

Further features of the invention arise out of the Figures which are described below. Shown are.

Figure 1A:
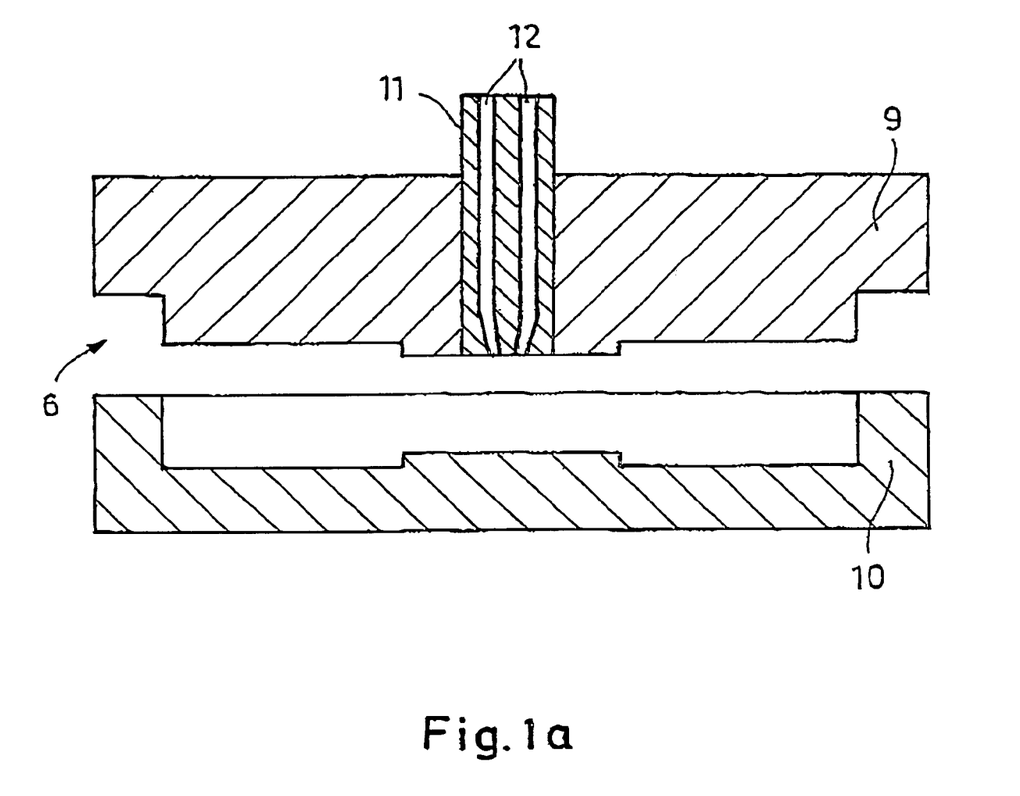
FIGS. 1a–1c the injection/compression moulding of the green compact of ceramic brake disks, FIGS. 2a–2d the transfer moulding of the green compact of ceramic brake disks, FIG. 3 the fibre orientation as a result of central injecting, FIG. 4 a ceramic brake disk with a special fin design, and FIGS. 5 and 6 in each case, a ceramic brake disk with special ventilation ducts.
Figure 1B:
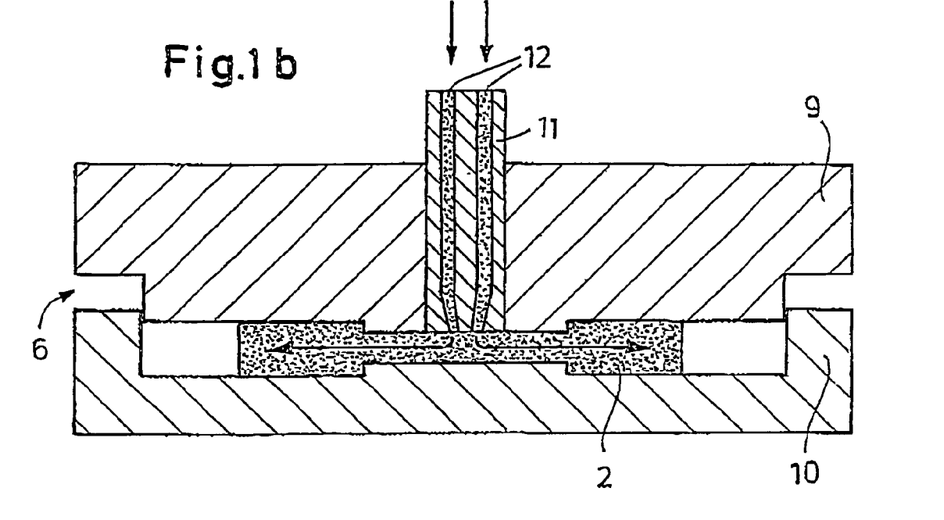
Figure 1C:
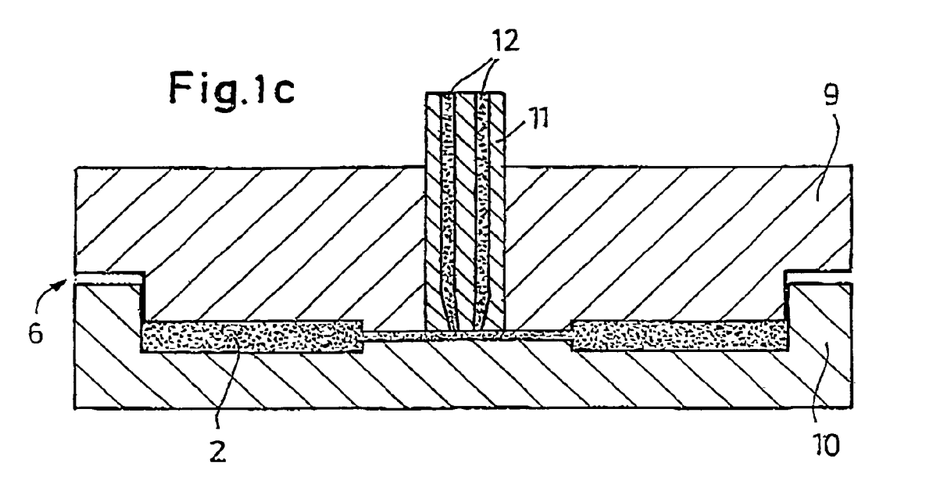

FIGS. 1a to 1c show the injection/compression moulding of the green compact of ceramic brake disks in an injection-moulding machine which consists of an upper part 9 and a lower part 10. Via a nozzle 11 arranged centrally in the upper part 9—in the case shown, with two injection ducts 12—the requisite quantity of BMC compound 2 is injected into the closed or slightly open tool 6. Subsequently the tool 6 is closed, i.e. the upper part 9 is displaced in the direction of the lower part 10, and in the process the compound 2 is pressed or compression-moulded into the desired shape. The lower part 10 and the upper part 11 have a shape that corresponds to the design of the desired ceramic brake disk.

FIG. 1a shows the tool 6 in the open state prior to injection of the compound. FIG. 1b shows the tool 6 in the slightly open state, i.e. the upper part 9 is raised slightly away from the lower part 10. In this state the compound 2 is injected via the nozzle 11 with the injection ducts 12. The temperature of the tool 6 and the pressure are adapted to the requirements of the compound 2.

FIG. 1c shows the actual pressing or compression moulding, i.e. the upper part 9 is moved in the direction of the lower part 10, and in this way the green compact is pressed or compression-moulded. Subsequently the tool 6 is opened, the green compact is taken out and supplied to stages for further treatment such as pyrolysation and melt infiltration.

FIGS. 2a to 2d show the transfer moulding of the green compact for ceramic brake disks.

Figure 2A:
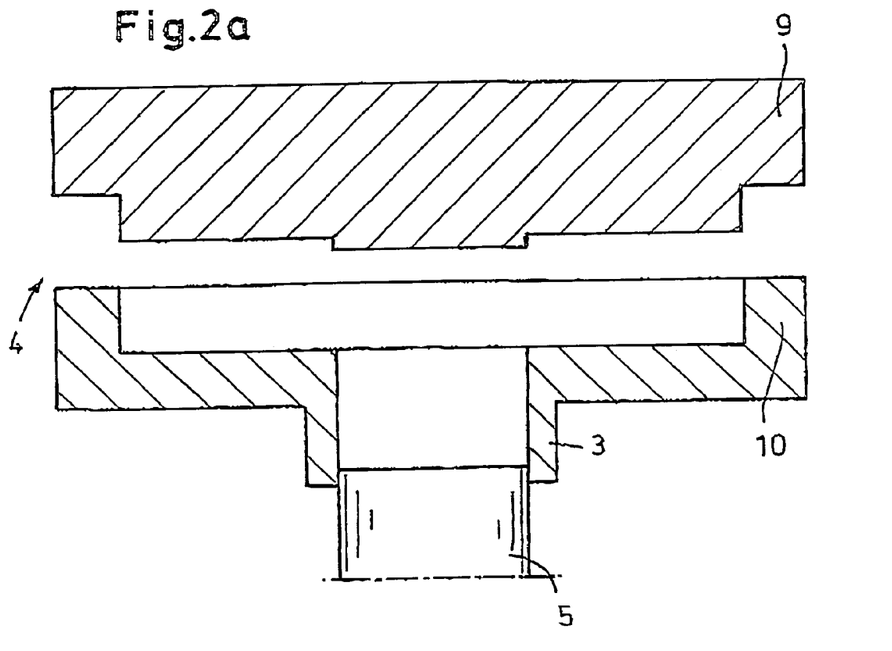

FIG. 2a shows the tool 4 in the wide-open state, i.e. the upper part 9 is raised far away from the lower part 10. In the middle of the tool 4, i.e. of the lower part 10, an injection cylinder 3 is arranged which contains a displaceable piston 5.

Figure 2B:
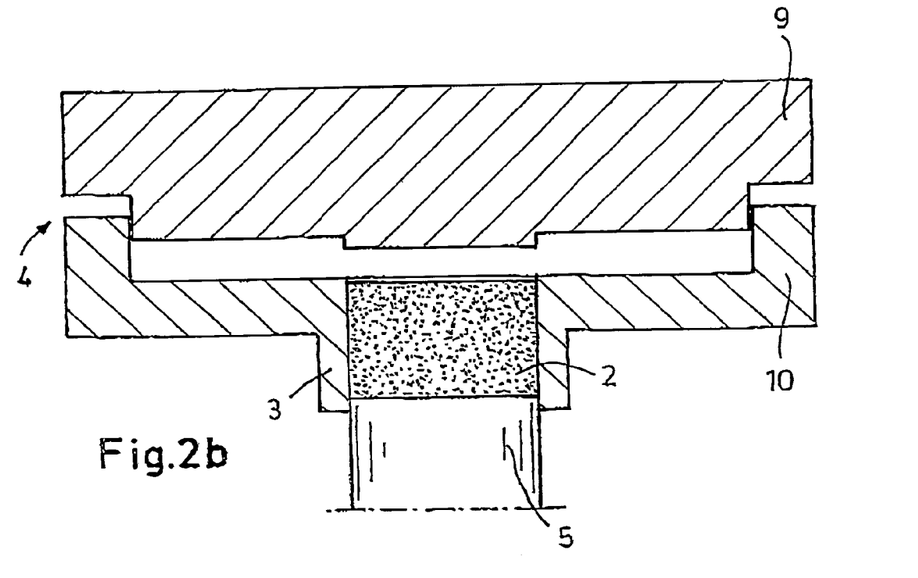

FIG. 2b shows the tool 4 in the partly closed state, the requisite quantity of compound 2 being disposed in the injection cylinder 3 on the piston 5. This quantity is fed in, or even injected, by conventional means. In this Figure the piston 5 is shown in the retracted state.

Figure 2C:
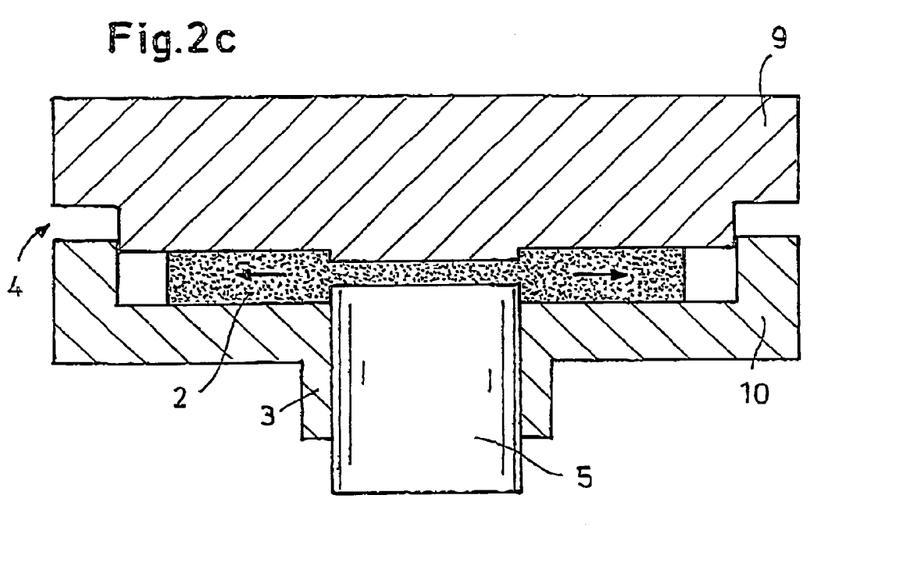

FIG. 2c shows the tool 4 shortly prior to completed processing of the green compact. The piston 5 is located in the almost extended position, and the compound 2 already almost fills out the entire mould.

Figure 2D:
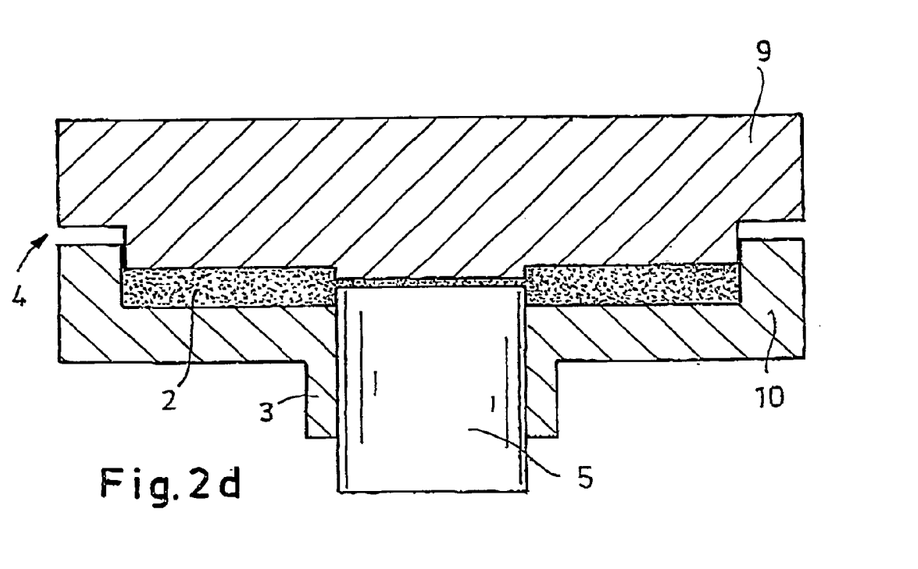

FIG. 2d shows the tool 4 after the transfer-moulding operation. The tool 4 is now completely closed, and the piston 5 is located in its final position. The green compact has been moulded and can be taken out after the tool 4 has been opened.

Figure 3:
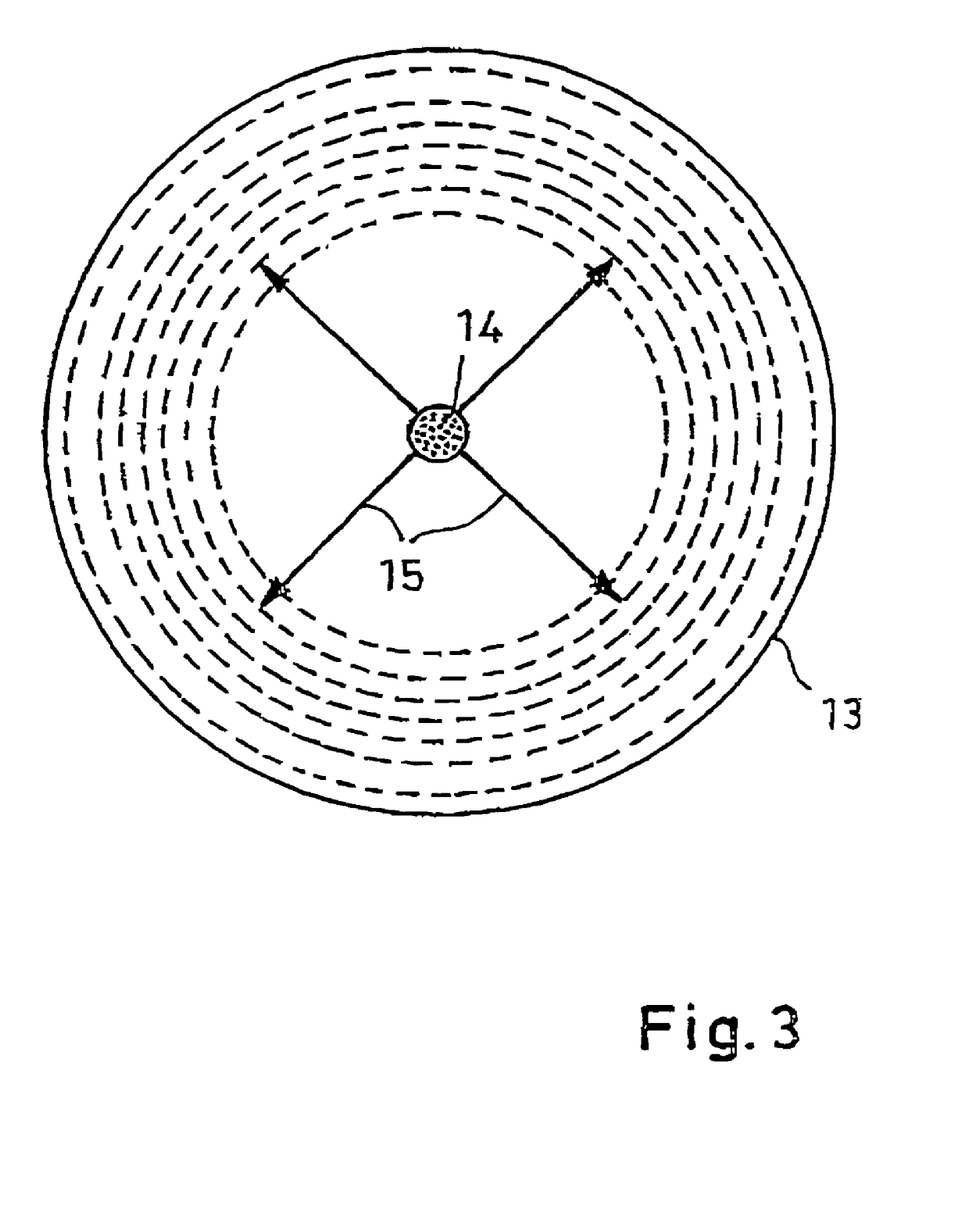

FIG. 3 shows the fibre orientation 15 in a section through a green compact 13. A preorientation of the fibres is effected as a result of the central injecting via the nozzle 14. When the tool is closed, as described above, a further orientation of the reinforcing fibres subsequently takes place in the radial direction.

Figure 4A:
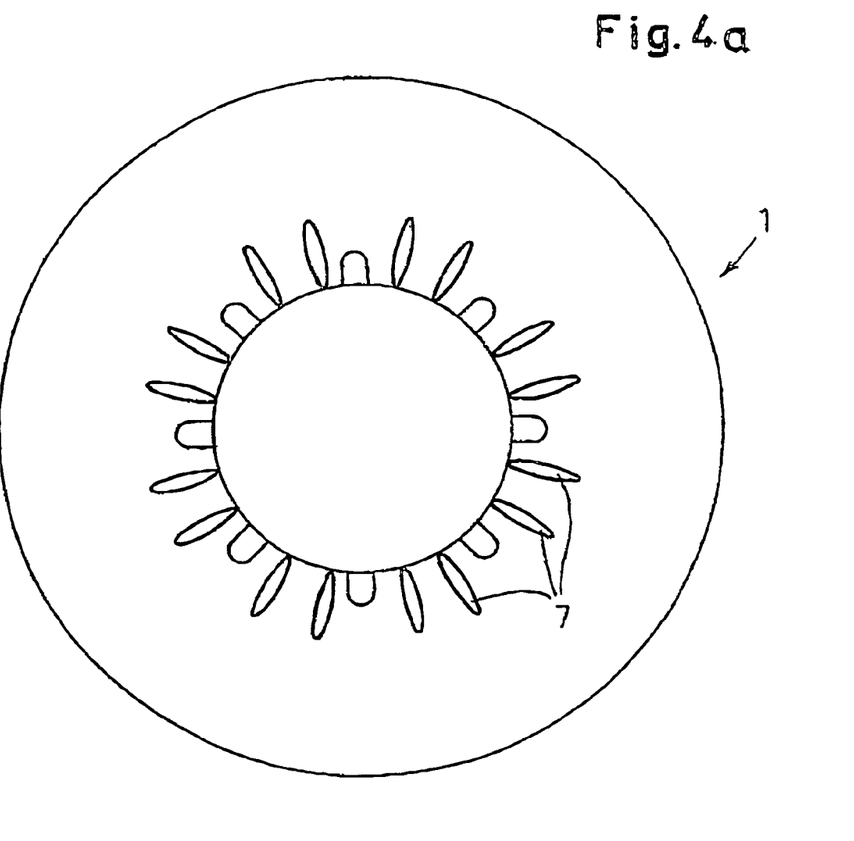
Figure 4B:
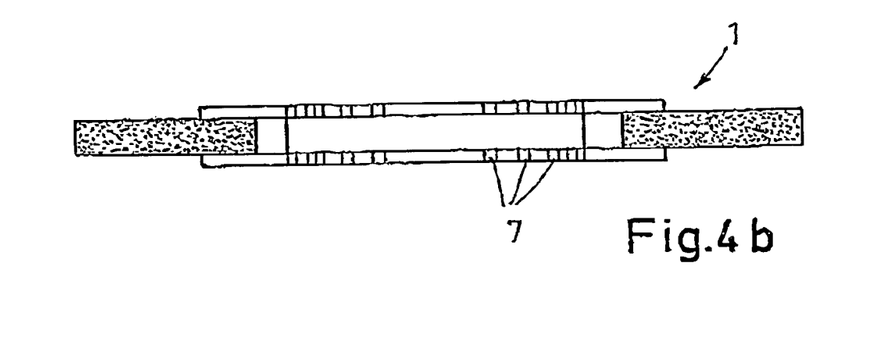

FIG. 4 shows a finished ceramic brake disk 1 with a two-sided fin design for the purpose of cooling the surface of the disk. To this end, ventilation fins 7 are arranged on the inside diameter. In this special case the ventilation fins 7 extend in the radial direction. The ventilation fins 7 are uniformly distributed in the peripheral direction.

Figure 5A:
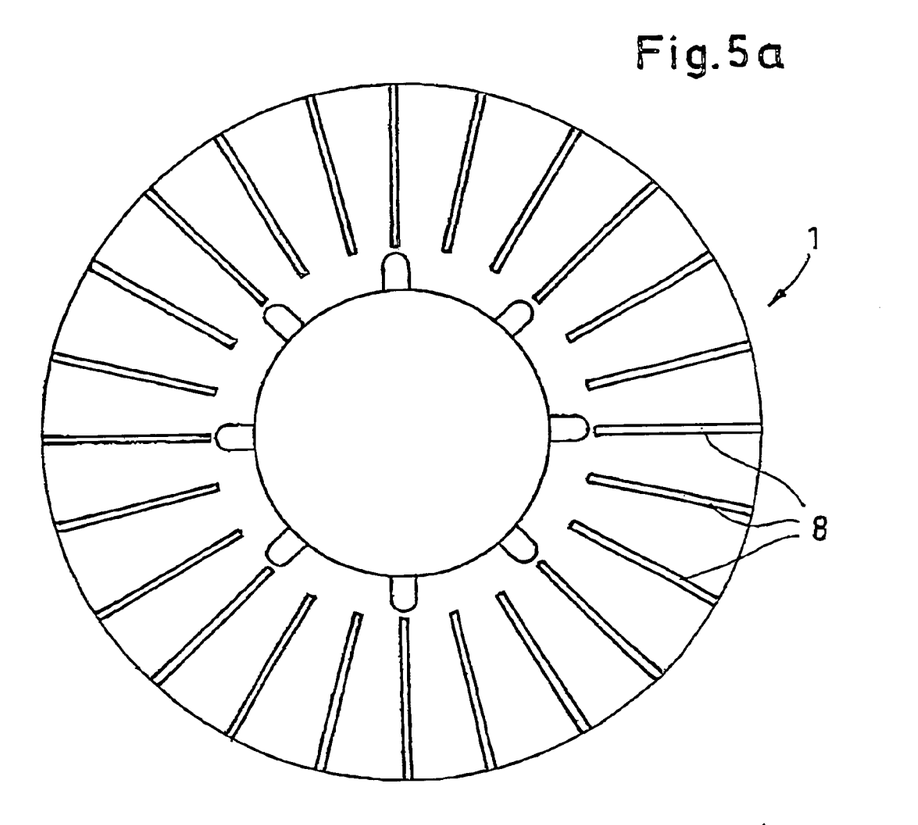
Figure 5B:
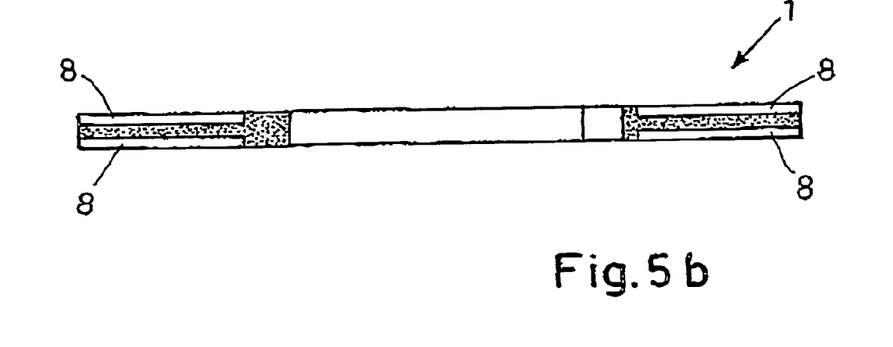
Figure 6A:
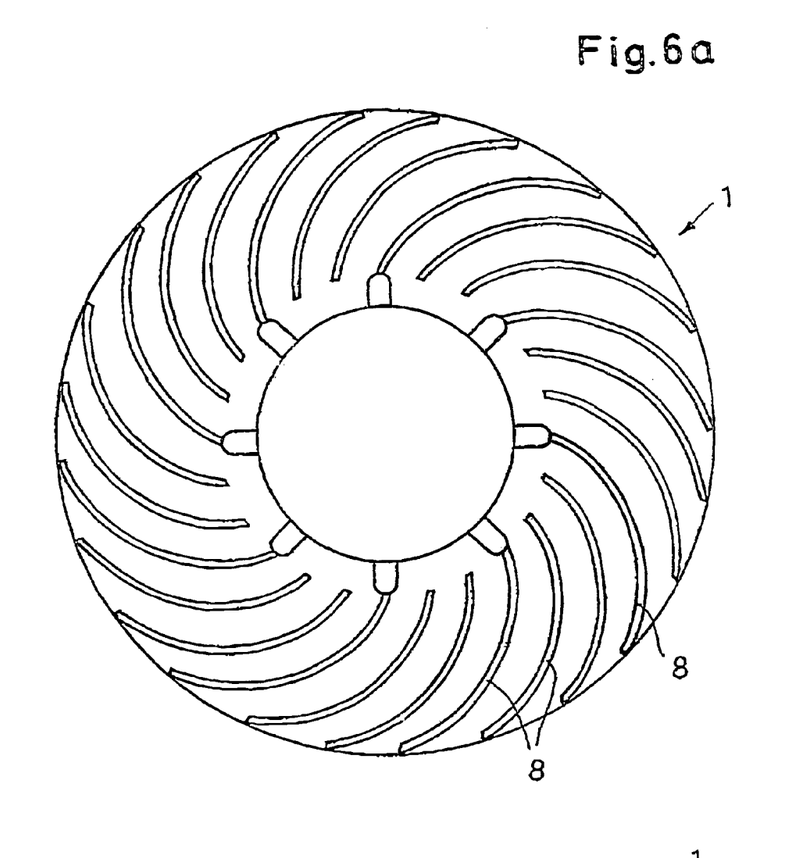
Figure 6B:
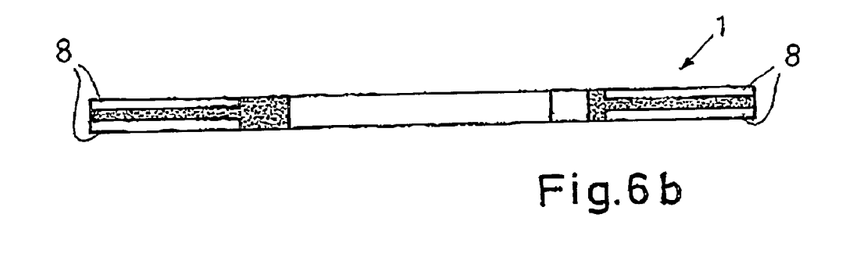

FIGS. 5 and 6 show ventilation ducts 8 on both sides of the ceramic brake disk 1. In FIG. 5 these ventilation ducts extend to the surface of the brake disk in radial manner, and in FIG. 6 in involute manner. These ventilation ducts 8 have been directly created by virtue of slit-shaped indentations in the course of transfer moulding or injection/compression moulding of the green compact.

The invention claimed is:

1. A process for producing ceramic brake disks from BMC, comprising the following process steps:
    a) producing a BMC compound with a matrix comprising phenolic resin and carbon reinforcing fibres the carbon reinforcing fibres having a length between 6 mm and 50 mm,
    b) producing a green compact of the ceramic brake disks from the BMC compound using a transfer-moulding process or an injection/compression process,
    c) pyrolysing the green compact for the purpose of producing a porous moulded article and
    d) melt infiltrating the porous moulded article with a melt for the purpose of producing a moulded article with reaction-bonded fibres.

2. Process according to claim 1, characterised in that the BMC compound contains different lengths of carbon reinforcing fibre.

3. Process according to claim 1, characterised in that the proportion of fibre in the BMC compound amounts to between 10 per cent by volume and 60 per cent by volume.

4. Process according to claim 1, charecterised in that the step of producing the green compact comprises introducing several BMC compounds with varying lengths of fibre simultaneously into a transfer-moulding tool or an injection/compression-moulding tool.

5. Process according to claim 1, characterized in that in the step of producing the green compact uses a transfer-moulding process using a transfer-moulding tool having arranged in the middle thereof an injection cylinder in which the requisite quantity of BMC compound is introduced and injected into the open tool by reciprocating motion of a piston in the injection cylinder.

6. Process according to claim 1, characterized in that the step of producing the green compact uses a injectlon/compression-moulding process in an injection-moulding machine which has been adapted to the BMC compound in its pressure and temperature settings, and the BMC compound is injected into a closed or slightly open tool and subsequently the tool is closed and in the process the BMC compound is pressed or compression-moulded into the desired shape.

7. Process according to claim 1, characterised in that the green compact of the ceramic brake disks exhibit ventilation fins on the inside diameter on both sides of the green compact of the ceramic brake disk.

8. Process according to claim 1, characterised in that the green compact comprises uninterrupted ventilation ducts in straight, circular or involute arrangement disposed on both sides of the green compact of the ceramic brake disk on the surface of the brake disk for the purpose of dissipating heat.

9. Process according to claim 8, characterised in that the ventilation ducts have a cross-section in angular or round form, and widths between 1 mm and 10 mm.

10. Process according to claim 1, characterized in that the melt is a silicon melt.

* * * * *